US011054509B2

(12) United States Patent
Freeman et al.

(10) Patent No.: US 11,054,509 B2
(45) Date of Patent: Jul. 6, 2021

(54) MULTILINE RECEIVE BEAMFORMERS AND RELATED SYSTEMS AND METHODS

(71) Applicant: KONINKLIJKE PHILIPS N.V., Eindhoven (NL)

(72) Inventors: Steven Russell Freeman, Eindhoven (NL); Michael Thomas McMillan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 52 days.

(21) Appl. No.: 15/546,020

(22) PCT Filed: Jan. 18, 2016

(86) PCT No.: PCT/IB2016/050215
§ 371 (c)(1),
(2) Date: Jul. 25, 2017

(87) PCT Pub. No.: WO2016/120744
PCT Pub. Date: Aug. 4, 2016

(65) Prior Publication Data
US 2018/0003810 A1   Jan. 4, 2018

Related U.S. Application Data

(60) Provisional application No. 62/109,103, filed on Jan. 29, 2015.

(51) Int. Cl.
*G01S 7/52* (2006.01)
*G01S 15/89* (2006.01)

(52) U.S. Cl.
CPC ........ *G01S 7/52095* (2013.01); *G01S 7/5208* (2013.01); *G01S 15/8915* (2013.01); *G01S 15/8927* (2013.01); *G01S 15/8993* (2013.01)

(58) Field of Classification Search
CPC ........ G01S 7/52; G01S 15/89; G01S 7/52095; G01S 15/8915; G01S 7/5208; G01S 15/8927; G01S 15/8993
See application file for complete search history.

(56) References Cited

U.S. PATENT DOCUMENTS 5,544,128 A     8/1996   Kim et al.
5,964,708 A  * 10/1999   Freeman ............. G01S 7/52028
                                                          600/447

(Continued)

FOREIGN PATENT DOCUMENTS

EP     1860459 A1    11/2007
EP     2980803 A1     2/2016

(Continued)

OTHER PUBLICATIONS

Simply Electronics; That Ground Symbol (What is Ground?)—Electronics Basics 24; https://www.youtube.com/watch?v=WwgbgY8mVIY Nov. 7, 2016<br> (Year: 2016).*

*Primary Examiner* — Hovhannes Baghdasaryan
*Assistant Examiner* — Amie M Ndure

(57) ABSTRACT

Microbeamformers coupled to groups of array elements which partially beamform groups of elements for the formation of multiple receive lines are provided. In the microbeamformers, a delay line can be configured to output multiple signal streams that can be delayed by different amounts to support multiline receive in a microbeamformer. A read process during beamforming is not destructive, thereby allowing multiline receive beams to be generated from a single delay line.

17 Claims, 6 Drawing Sheets

(56) References Cited

U.S. PATENT DOCUMENTS

| | | | |
|---|---|---|---|
| 6,500,120 B1* | 12/2002 | Anthony | G01S 7/5208 |
| | | | 600/437 |
| 8,177,718 B2 | 5/2012 | Savord | |
| 2001/0051772 A1 | 12/2001 | Bae | |
| 2005/0131299 A1 | 6/2005 | Robinson et al. | |
| 2005/0192727 A1* | 9/2005 | Shostak | B60C 11/24 |
| | | | 701/37 |
| 2006/0173335 A1 | 1/2006 | Matin et al. | |
| 2006/0025897 A1* | 2/2006 | Shostak | B60C 23/005 |
| | | | 701/1 |
| 2006/0180371 A1* | 8/2006 | Breed | G07C 5/008 |
| | | | 180/197 |
| 2006/0212194 A1* | 9/2006 | Breed | G07C 5/008 |
| | | | 701/1 |
| 2007/0161904 A1* | 7/2007 | Urbano | A61B 8/00 |
| | | | 600/459 |
| 2008/0110261 A1* | 5/2008 | Randall | A61B 8/00 |
| | | | 73/592 |
| 2008/0110263 A1* | 5/2008 | Klessel | G01S 7/52028 |
| | | | 73/602 |
| 2008/0114245 A1* | 5/2008 | Randall | A61B 8/42 |
| | | | 600/447 |
| 2009/0326375 A1 | 12/2009 | Magee | |
| 2012/0197130 A1 | 8/2012 | Amemiya et al. | |
| 2014/0355381 A1* | 12/2014 | Lal | B81B 3/0021 |
| | | | 367/87 |

FOREIGN PATENT DOCUMENTS

| | | |
|---|---|---|
| JP | H01116996 A | 5/1989 |
| JP | 2004506498 A | 3/2004 |
| JP | 2010068957 A | 4/2010 |
| WO | 0217297 A1 | 2/2002 |
| WO | 0217298 A1 | 2/2002 |

* cited by examiner

MULTILINE RECEIVE BEAMFORMERS AND RELATED SYSTEMS AND METHODS

This application is the U.S. National Phase application under 35 U.S.C. § 371 of International Application No. PCT/IB2016/050215, filed on Jan. 18, 2016, which claims the benefit of Provisional Application Ser. No. 62/109,103, filed Jan. 29, 2015. These applications are hereby incorporated by reference herein.

BACKGROUND

Ultrasound array transducers may be configured as a single row of transducer elements, a one-dimensional (1D) array for imaging a two dimensional (2D) image plane, or as a two dimensional (2D) array of transducer element for imaging a three dimensional region. A 2D array comprises elements extending in both azimuth and elevation directions which can be operated fully independently to both focus and steer beams in any azimuth or elevation direction. These arrays can be configured in either flat or curved orientations.

Two dimensional array transducers as well as 1D arrays with large numbers of elements pose a problem due to their large number of transducer elements. Since each of these elements must be individually controlled on transmit and receive, a separate signal line must be provided for each element. A 1D array may include a row of 100-200 elements, requiring 100-200 signal lines, which can be accommodated in a relatively small and light probe cable, but may need to operate with a system beamformer of relatively few channels. A 2D array may have 100-200 rows of elements in one dimension and 100-200 columns of elements in the other dimension, totaling thousands of individual elements. A cable of many thousands of signal lines is not practical for a probe which is hand-held and must be manipulated by the sonographer. To address this, a microbeamformer integrated circuit can be attached to the transducer array which performs partial beamforming of groups of elements referred to as patches. The individually delayed and summed signals of each patch are conducted over a standard size cable to the ultrasound system beamformer where the summed signal from each patch is applied to a channel of the system beamformer, which completes the beamforming operation.

Unfortunately, the microbeamforming approach with partially summing patch elements is limited with multiline receive beamforming. Multiline receive beamforming is frequently used in mainframe beamforming to improve frame rate by creating multiple receive beams from a single transmit beam. Microbeamforming, however, involves forming partial beams ahead of the mainframe beamformer. This has the disadvantage that the mainframe can only apply different receive beamforming delays to the partial sums and in some cases this limits the degree to which multiline receive beams can be formed. The larger the group of elements in the partial sum (microbeamformer outputs) the harder it is to accomplish high quality multiline receive. Matrix arrays can include forming partial sums from small or large groups of elements, and in this case the multiline receive capability of the mainframe will be degraded because it cannot 'resteer' these summed signals. Multiline receive performance, therefore, is compromised. Patches in 1D arrays may be very large relative to the ultrasound wavelength and thus cannot do high-quality multiline receive.

Thus, there is a need for improved architectures and methods for multiline receive beamforming when partial sums (microbeamforming) are used.

SUMMARY

In some embodiments, the present invention provides a receive beamformer including a delay element including analog random access memory (ARAM), which can include an input line configured to receive an input analog electrical signal generated from a received acoustic signal from an array of transducer elements, a write shift register configured to operate a plurality of write switches connected to the input line, a plurality of capacitive elements configured to store a charge that can be read from a plurality of outputs at different delay times, a plurality of read shift registers configured to operate a plurality of read switches connected to the plurality of outputs such that the charge is read at the different delay times from different outputs, and a plurality of summing elements, each summer configured to sum output signals from each of the outputs of the capacitive elements.

In certain embodiments, the receive beamformer can be configured such that stored charges from the plurality of outputs can be read in parallel at different delay times. For example, a first output on each of the plurality of capacitive elements can be read at one delay time, and a second output on each of the plurality of capacitive elements can be read at a different delay time.

In some embodiments, at least one capacitive element of the plurality includes a capacitor that is coupled to the input line and a DC voltage source during a write operation. The capacitor can be also coupled to a plurality of amplifiers configured to allow interrogation of a stored charge on the capacitor that can be read at different delay times. In certain embodiments, at least one of the capacitive elements includes a plurality of capacitors that are coupled to the write switches such that charge can be written on to each respective capacitor in the plurality. The plurality of capacitors can be coupled to a plurality of amplifiers configured to allow interrogation of stored charges on the capacitors. The receive beamformer can also be configured to read the stored charges on the capacitors at the same or different times.

In certain embodiments, the number of summing nodes in the beamformer can correspond to a number of lines beamformed during multiline receive beamforming. The multiline receive beamforming can include Nx numbers of multilines, such as 2x or greater multiline receive beamforming. The beamformer can be coupled to an array of transducer elements, such as a one-dimensional array or a two-dimensional array of transducer elements. Received acoustic signal by the beamformer can also be generated from a patch of transducer elements in the array, and summing elements in the beamformer can include summing nodes, common buses, and/or summing circuits. The write and read shift registers can include decoders and input and output counters, respectively, for programmable delay times. In some embodiments, the write and read shift registers comprise cyclized one hot shift registers. The beamformers of the present invention can be included in ultrasound probes, which can be coupled to ultrasound systems.

The present invention further includes methods of multiline receive beamforming. For example, the present includes a method of multiline receive beamforming that can include receiving, on an input line, an input analog electrical signal generated from a received acoustic signal from an array of transducer elements, using a write shift register to operate a plurality of write switches connected to the input line, storing a charge on a plurality of capacitive elements, each having a plurality of outputs, using a plurality of read shift registers to operate a plurality of read switches connected to the plurality of outputs such that the charge is read at the different delay times from different outputs, and summing output signals from each of the outputs of the capacitive elements on a plurality of summing elements. In the methods, at least one capacitive element of the plurality can include a capacitor that is coupled to the input line and a DC voltage source during a write operation. The capacitor can also be coupled to a plurality of amplifiers configured to allow interrogation of a stored charge on the capacitor that can be read at different delay times. In certain embodiments, at least one of the capacitive elements in the method can include a plurality of capacitors that are coupled to the write switches such that charge can be written on to each respective capacitor in the plurality.

DETAILED DESCRIPTION

Figure 1:
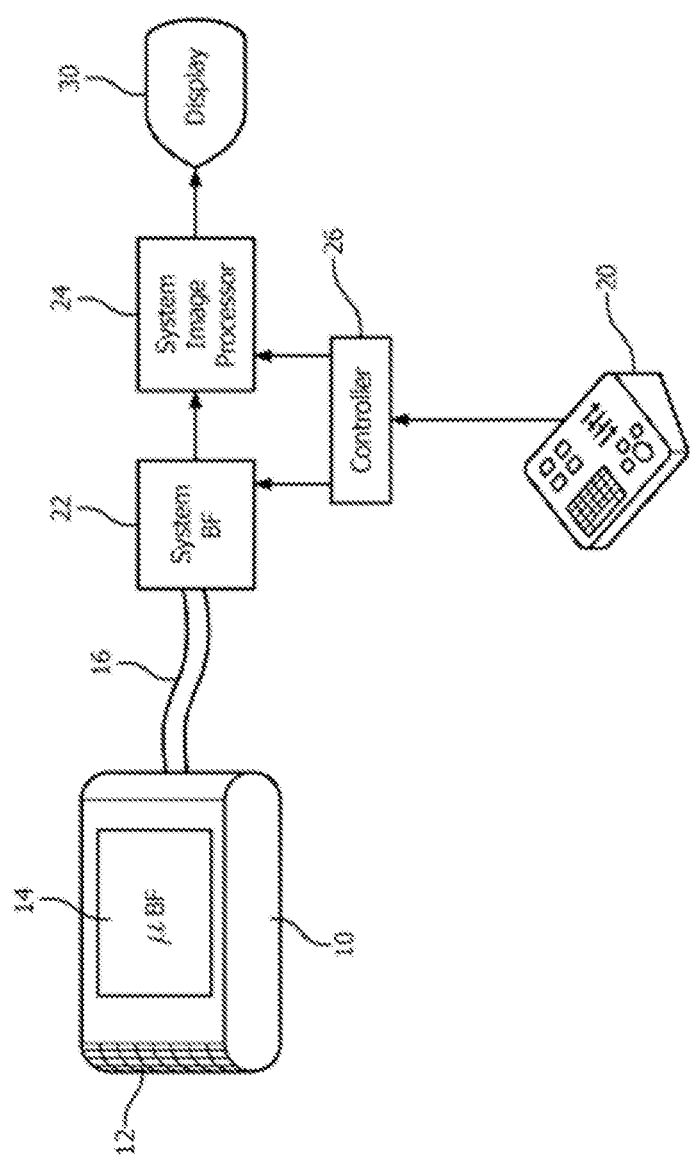
FIG. 1 is a schematic view of an embodiment of an ultrasound imaging system according to an illustrative embodiment of the invention.

In the following detailed description, for purposes of explanation and not limitation, illustrative embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the illustrative embodiments. Such methods and apparatus are within the scope of the present teachings.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of certain features will not be discussed when they would be apparent to those with skill in the art so as not to obscure the description of the present system.

The present invention is related to array transducers which use microbeamformers coupled to groups of array elements which partially beamform groups of elements for the formation of multiple receive lines. Microbeamforming can use an Analog RAM, which is a switched-capacitor storage array that samples an incoming RF signal on every microchannel and applies a delay by reading out the samples some time later. The time from the write event to a particular capacitor to when that charge is read out is the effective delay. The write event can be controlled by a cycling one-hot shift register that strobes a passgate to charge up one capacitor (relative to a constant voltage referred to as VMID) during the sampling interval. The read event can be controlled by another one-hot shift register that connects the two sides of the capacitor across an output buffer. The output buffer creates a step-wise voltage at the output that mimics the voltage stored across the capacitor. Another sample interval later another capacitor can be switched across that output buffer. In this way the output voltage is a delayed step-wise representation of the input RF signal.

Multiline is frequently used to provide improved frame rates, but currently microbeamformers provide only a single-read capability. In certain aspects, the present invention is directed to a read process—switching the storage capacitor across the output buffer—that is non-destructive, which allows multiple read operations. For example, the present invention utilizes the same ARAM delay line and just re-reads the samples for each uniquely delayed output. In particular, the present invention provides an analog circuit that allows a delay line to output multiple output streams that could be delayed by different amounts to support multiline receive in a microbeamformer. Each output from the delay line can be a constituent to a beam for multiline receive beamforming. For example, two outputs correspond to 2× multiline receive beamforming, four outputs to 4× multiline receive beamforming, and so on. The present invention, e.g., allows for the possibility of re-reading from that same capacitor at some later time (controlled by a second, third, or fourth shift register) and connecting it across a second, third, or fourth output buffer. This allows numerous step-wise output sample streams to be derived from the same single input, where each output stream can have a unique delay. The write control and ARAM storage cap structure can be shared among each of these unique outputs, thereby providing increased space and power efficiency. The increased space and power efficiency can have a number of advantages for ultrasound probes, such more available space for other components in the probe as well as less heat generated during scanning.

Microbeamforming involves consolidating information from many elements (a group or patch) into a single output that is then digitized by the mainframe. Multiline receive, as typically done in the mainframe (using multi-port RAMs), becomes difficult or impossible to do depending on how large a group of elements is summed together ahead of the A/D. This is because the differential delays needed for multiline receive in the mainframe can only be applied to entire (microbeamformed) groups. In the limit, a microbeamformer could do all of the beamforming ahead of a single A/D and at that point mainframe-based receive multiline is impossible (the beam is already fully formed—1×). The present invention, e.g., applies different delays to each microchannel in order to form differently steered receive multilines. The present invention can also allow high-funneling-ratio microbeamformers (i.e. large groups) to still be able to do reasonably high order multiline that improves frame rate.

In some aspects, the present invention provides ultrasound transducer probes and ultrasound systems that include delay lines having multiple outputs for multiline receive beamforming. Referring first to FIG. 1, an ultrasound system constructed in accordance with the principles of the present invention is shown in block diagram form. A probe 10 has a transducer, such as a two dimensional array transducer 12. The elements of the array are coupled to a microbeamformer 14 located in the probe behind the transducer array. The microbeamformer applies timed transmit pulses to elements of the array to transmit beams in the desired directions and to the desired focal points in the three dimensional image field in front of the array. Echoes from the transmitted beams are received by the array elements and coupled to delays of the microbeamformer 14 where they are individually delayed. As provided further herein, received signals from the array can be input into the microbeamformer and according to the architecture of the present invention with a non-destructive read of the stored charge, multiple outputs can be read at different delay times. In some aspects, the delayed signals of a group of transducer elements constituting a patch can be combined to form a partial sum signal for the patch. The elements of a patch in this embodiment are operated together and have their signals individually delayed in relation to a reference and then combined by the microbeamformer to form one signal from the patch to a probe conductor or an ultrasound system beamformer channel. Because multiple outputs from the delay line can be read at different times, different beams can be formed with a single delay line using different delays for each of the respective outputs. Combining of the different signals can be done by coupling the delayed signals from the elements of the patch to a common bus or summing node. Summing circuits or other circuitry can also be used. The summing node of each patch is coupled to a conductor of a cable 16, which conducts the partial beamsum patch signal to the system mainframe. In the system mainframe the patch signals are digitized and coupled to channels of a system beamformer 22, which appropriately delays each patch signal. The delayed patch signals are then combined to form a coherent steered and focused receive beam. The beam signals from the 3D image field are processed by a system image processor 24 to produce 2D or 3D images for display on an image display 30. Control of ultrasound system parameters such as probe selection, beam steering and focusing, and signal and image processing is done under control of a controller 26 which is coupled to various modules of the system. In the case of the probe 10 some of this control information is provided to the microbeamformer from the system mainframe over data lines of the cable 16. The user controls many of these operating parameters by means of a control panel 20.

Figure 2:
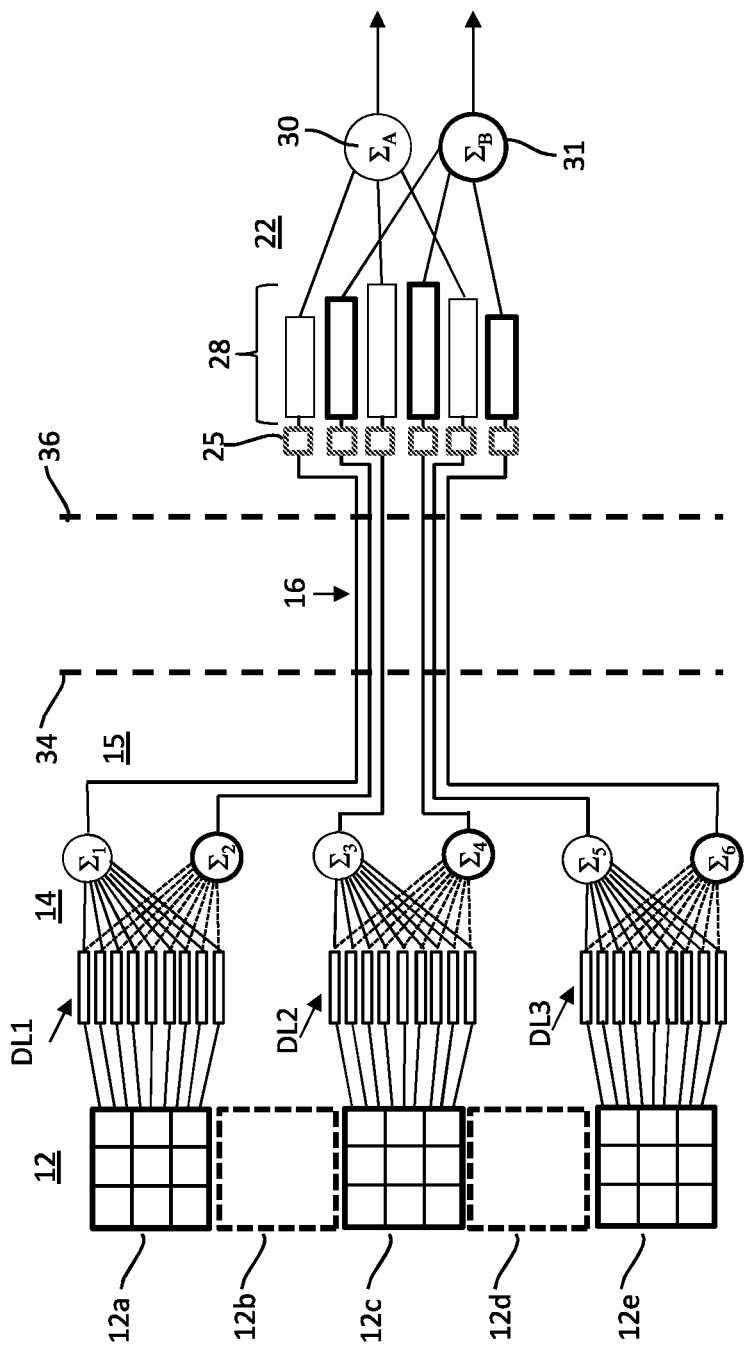
FIG. 2 is a block diagram illustrating a microbeamformer and system beamformer according to an illustrative embodiment of the invention.

FIG. 2 illustrates the concept of a partially summing microbeamformer including the delay line elements of the present invention. The drawing of FIG. 2 is sectioned into three areas by dashed lines 34 and 36. Components of the probe 10 are shown to the left of line 34, components of the system mainframe are shown to the right of line 36, and the cable 16 is shown between the two lines. The elements of the transducer array 12 of the probe are divided into patches of contiguous transducer elements. Five of the patches of the array 12 are shown in the drawing, each including nine neighboring elements. The microbeamformer channels for patches 12a, 12c, and 12e are shown in the drawing. The nine elements of patch 12a are coupled to nine delay lines of the microbeamformer indicated as DL1. Similarly the nine elements of patches 12c and 12e are coupled to the delay lines indicated at DL2 and DL3. The delays imparted by these delay lines are a function of numerous variables such as the size of the array, the element pitch, the spacing and dimensions of the patch, the range of beam steering and focusing, and others. The delay line groups DL1, DL2, and DL3 each delay the signals from the elements of their respective patch to a common time or phase reference. As shown, each of the delay lines in DL1, DL2, and DL3 have two outputs that may apply different delays to the signal. Two outputs are shown by way of example. Multiple outputs are envisioned, including four, eight, sixteen, and thirty-two outputs could be used, e.g., for 2×, 4×, 8×, 16×, and 32× multiline beamforming. The delayed signals from each output of each group of delay lines are then combined by a respective summer $\Sigma_1$, $\Sigma_2$, $\Sigma_3$, $\Sigma_4$, $\Sigma_5$, and $\Sigma_6$, respectively, to form a partial sum signal of the array from the patch of elements. Each partial sum signal is put on a separate bus 15, each of which is coupled to a conductor of the cable 16, which conducts the partial sum signals to the system mainframe. In the system mainframe each partial sum signal is applied to an A/D converter 25 and then to a delay line 28 of a channel of the system beamformer 22. These delay lines steer and focus the partial sum signals into multiple output beams via system beamformer summers 30 and 31 (shown as $E_A$ and $E_B$). The fully formed beams that represent the signal intensities along two different lines in the field of view can then be forwarded to the system image processor for further signal processing and display. The mainframe beamforming delays 28 can also be further bifurcated in the manner of standard receive multiline beamforming, to form more receive beams that the two shown here 30 & 31.

While the example of FIG. 2 is shown with 9-element patches, it will be appreciated that a constructed microbeamformer system will often have patches with larger numbers of elements such as 16, 32, 48, or 70 elements or more. The elements of a patch can be adjacent to each other, be spaced apart, or even intermingled in a checkerboard pattern, with "odd" numbered elements combined in one patch and "even" numbered elements combined in another. The patches can be linear, square, rectangular, diamond-shaped, hexagonal, or any other desired shape. It will also be appreciated that the position of the microbeamformer 14 in the handle of the transducer 10 is intended to reduce cable complexity, however, in some embodiments the microbeamformer could be more closely integrated with the mainframe beamformer with, for example, a conventional cable linking a conventional array to the connector or system containing the microbeamformer and mainframe beamformer.

Figure 3:
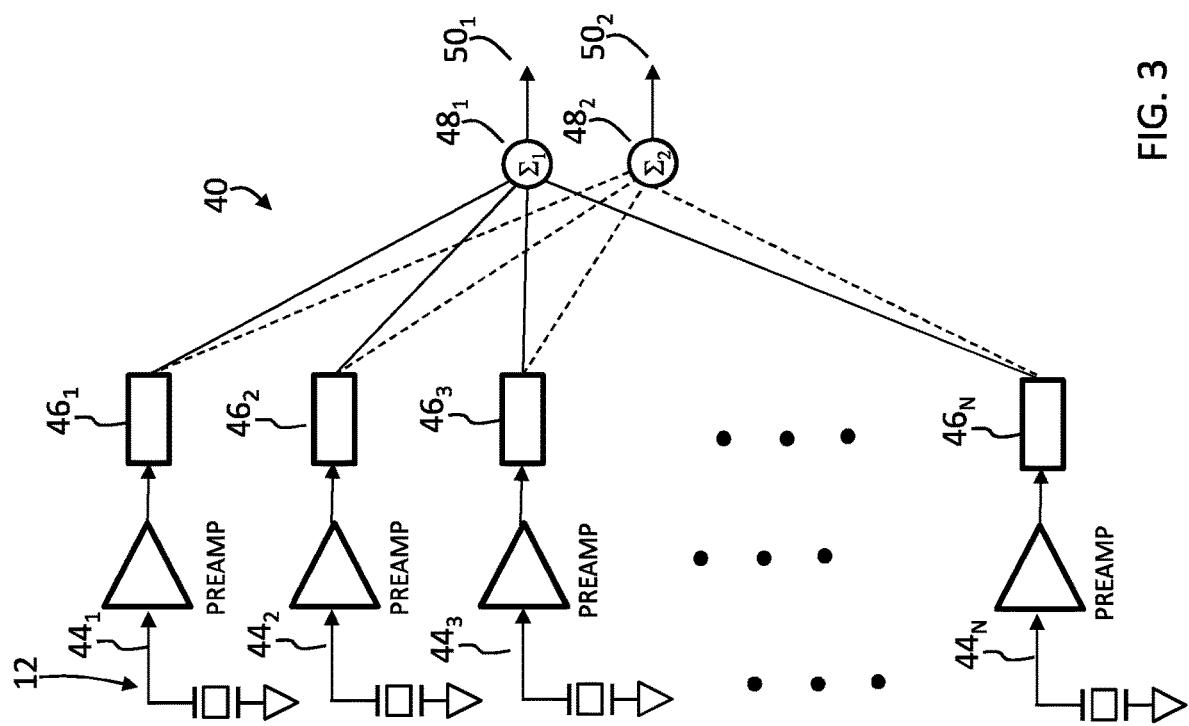
FIG. 3 shows a block diagram view of a beamforming architecture according to an illustrative embodiment of the invention.

FIG. 3 illustrates a more detailed view of the delay elements of the beamformer, in accordance with an embodiment of the present invention. As described in connection with FIG. 3, the channels $44_1$, $44_2$, $44_3$, . . . $44_N$ of receive beamformer 40, which are coupled to the array 12, include programmable delay elements $46_1$, $46_2$, $46_3$, . . . $46_N$ that have multiple outputs that correspond to different delayed reads of the stored charge in the delay element. Here, two outputs are shown by way of example. The first output from each delay line is coupled to a first summing element $48_1$, whereas the second output for each delay line is coupled to a second summing element $48_2$. The summing elements add the delayed signals from the respective outputs and provide the summed signals to the channel outputs $50_1$ and $50_2$ of receive beamformer 40.

In some embodiments, the beamformer 40 can be operated using a system controller, which includes a microprocessor and an associated memory. The system controller can be configured to control the operation of an ultrasound imaging system. For example, the system controller provides delay commands to the transmit beamformer channels via a bus. The delay data steers and focuses the generated transmit beams over transmit scan lines of a wedge-shaped transmit pattern, a parallelogram-shaped transmit pattern, or other patterns. The system controller also provides delay commands to the channels of the receive beamformer via a bus. The applied relative delays control the steering and focusing of the synthesized receive beams. As shown, each receive beamformer channel $44_N$ includes a variable gain amplifier (PREAMP), which controls gain as a function of received signal depth, and a delay element $46_N$ that delays acoustic data to achieve beam steering and dynamic focusing of the synthesized beam. The beamformer signal represents a receive ultrasound beam synthesized along a receive scan line.

Figure 4:
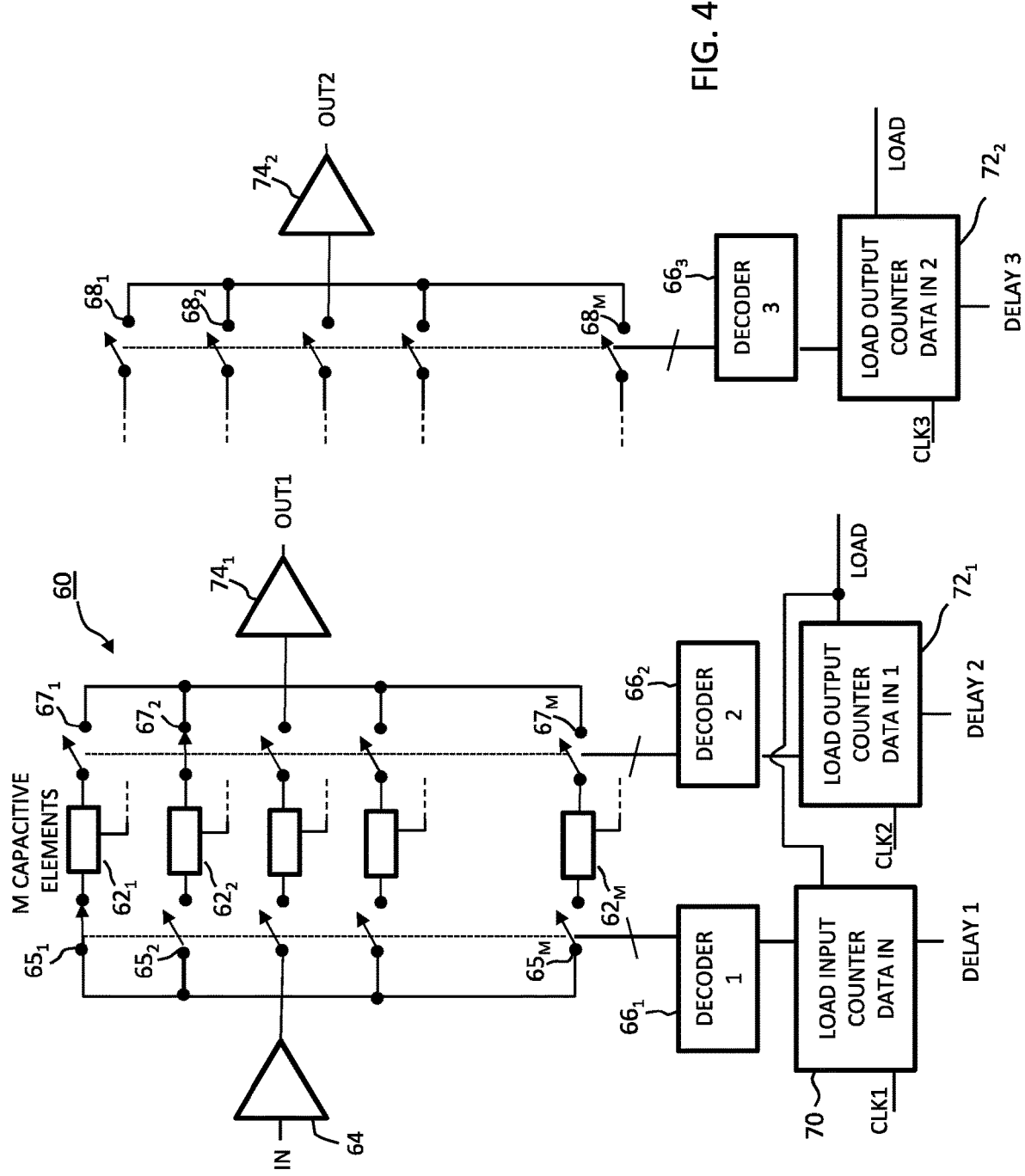
FIG. 4 shows an analog random access memory used as a programmable delay line according to an illustrative embodiment of the invention.

Referring again to FIG. 3, each analog delay line $46_N$ includes an analog RAM as is described in connection with FIG. 4. In FIG. 4, an analog random access memory (RAM) device 60 can be configured as a programmable delay element. The analog RAM device 60 includes a group of M storage capacitive elements (including, e.g., capacitors) $62_1$, $62_2$, . . . , $62_M$ for sampling the input signal using decoder $66_1$ connected to input switches $65_1$, $65_2$, . . . , $65_M$. The analog RAM device 60 also includes a first and second read capability where the decoders $66_2$ and $66_3$ control first output switches $67_1$, $67_2$, . . . , $67_M$ and second output switches $68_1$, $68_2$, . . . , $68_M$, respectively, to read the stored signal out with potentially different delays. An input buffer 64 receives a transducer signal that is then sent by input switch $65_N$ controlled by decoder $66_1$ to storage capacitive element $62_N$. As described further herein, the capacitive element of the present invention is configured for non-destructive reads such that when one read is processed the stored charge stays and can be read again at a different time. Here, two outputs from the capacitive elements are shown. Decoder $66_2$ coupled to output switches $67_M$ samples the individual capacitor charges at delay times determined by the difference in timing between an input counter 70 and a first output counter $72_1$. Accordingly, the transducer signals are delayed by selected delay times as they are transferred from input buffer 64 to a first output buffer $74_1$. Decoder $66_3$ coupled to output switches $68_M$ samples the individual capacitor charges at delay times determined by the difference in timing between an input counter 70 and a second output counter $72_2$. Accordingly, the transducer signals are delayed by selected delay times as they are transferred from input buffer 64 to a second output buffer $74_2$. It is noted that the dashed lines for the second output are shown to infer that the capacitive elements couple to the second decoder and output counter for different delay times to be applied to the second output from the capacitive elements. It is envisioned that other configurations can be used to write and read the charge off of the capacitive elements. For example, cyclized shift registers could also be used instead of a counter and decoder.

Figure 5:
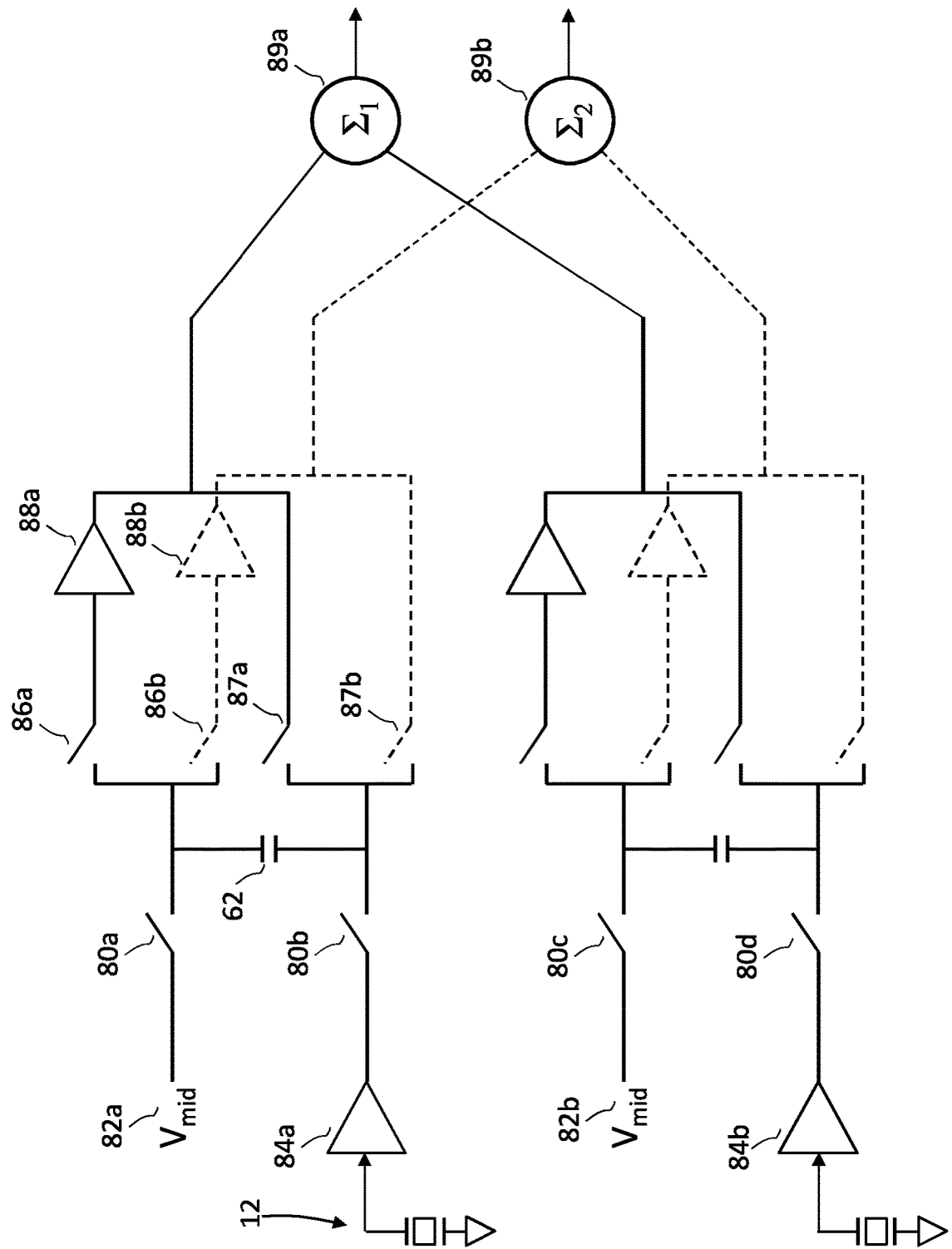
FIG. 5 illustrates a circuit included in an analog random access memory according to an illustrative embodiment of the invention.

FIG. 5 illustrates an example of an ARAM storage capacitor structure of the present invention. This example shows a 2x-multiline ARAM structure with two summing nodes from two different elements. As shown, the write-side passgates (80a, 80b, 80c, 80d) at the left connect to VMID 82a, 82b (e.g., a constant 1.25V) and the output of the preamplifiers 84a, 84b, (similar to the preamplifier 64 in FIG. 4) which are coupled to elements in the array 12. The passgates are controlled by digital circuits (not shown, but discussed earlier as possibly a counter 70 and decoder $66_1$) that enable each storage capacitor in sequence for a given time period depending on sample rate (e.g., 20-50 nsec). The voltage from the preamp is sampled and stored on the capacitor 62. The read ports for each corresponding output from the capacitor (86a and 87a for the first output, and 86b and 87b for the second) get enabled at different times and connect to two different output buffers 88a and 88b that in turn drive different summing elements 89a and 89b. For example, read ports 86a and 87a can be read at a first time providing a first delay, and read ports 86b and 87b can be read at a later, second time providing a second delay. Inverting amplifiers 88a and 88b are coupled to different ends of the capacitor, respectively, to non-destructively read the charge stored on the capacitor so that the voltage at the output of the buffer 88a and 88b are largely equivalent.

Figure 6:
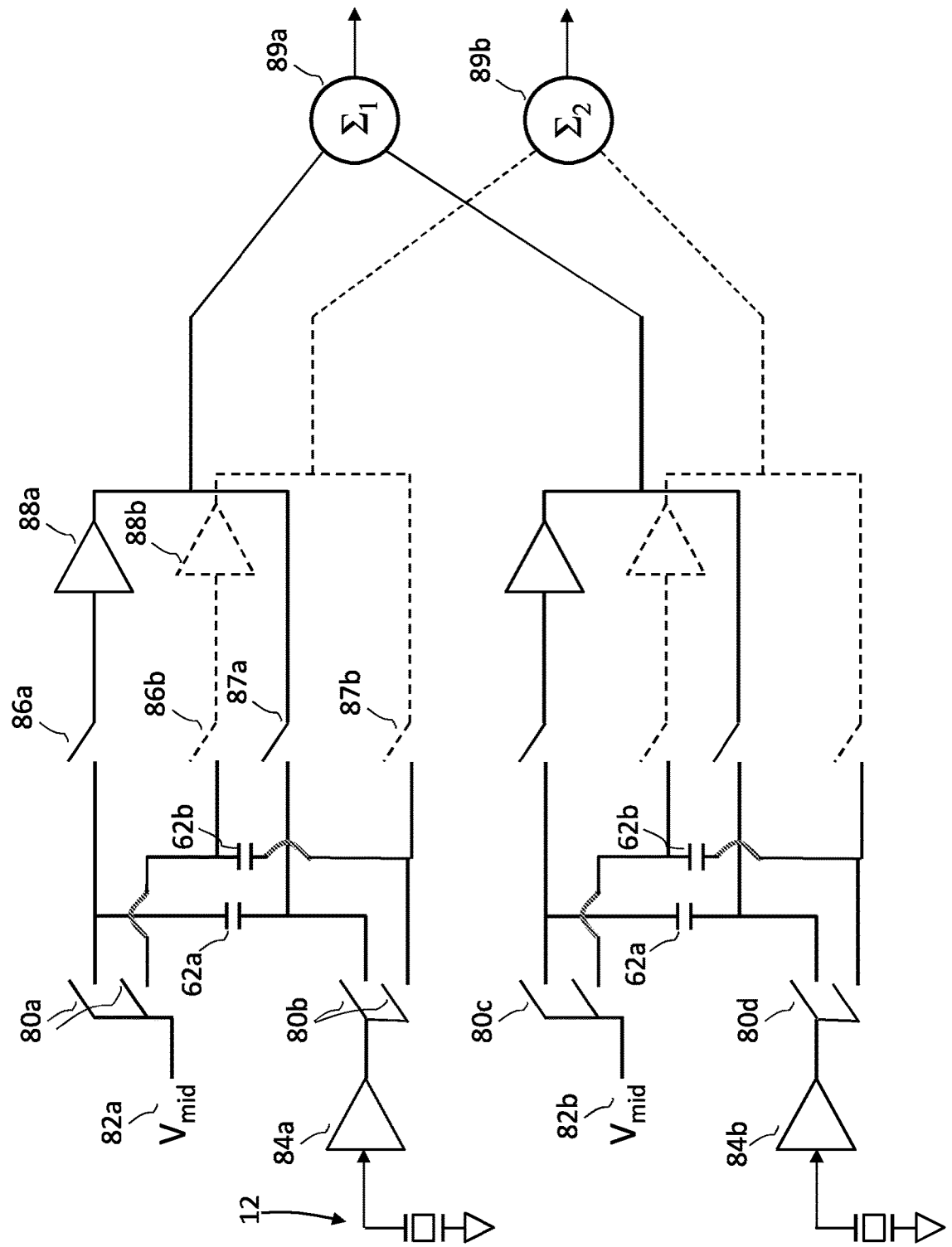
FIG. 6 illustrates a circuit included in an analog random access memory according to an illustrative embodiment of the invention.

Another possible implementation of this structure would essentially bifurcate the capacitive element into two equal halves (e.g., two different capacitors) that are shorted together by a switch during the write interval and then read out separately at the same or different times. This implementation is shown in FIG. 6, which is similar to FIG. 5, except that the write passgates 80a and 80b and storage capacitors 62a and 62b are split and the read side passgates 86a/87a and 86b/87b are read from the two different capacitors 62a and 62b. This structure includes two full delay structures per microchannel and the storage capacitor that is read out for each partial sum is half the size that was written to. This structure allows the two read ports to apply the same overall delay, whereas the shared structured shown in FIG. 5 could not have 86a/87a and 86b/87b passgates connected to the same capacitor at the same time (the amplifiers would fight one another). FIG. 6 further includes inverting amplifiers 88a and 88b; however, certain embodiments include the option in which no inverting amplifiers are used. In the latter, the read is destructive and in the former the read is non-destructive.

Certain additional advantages and features of this invention may be apparent to those skilled in the art upon studying the disclosure, or may be experienced by persons employing the novel system and method of the present invention, chief of which is that twice as many receive beams may be formed simultaneously, thus dramatically improving imaging frame rate.

Of course, it is to be appreciated that any one of the above embodiments or processes may be combined with one or more other embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A receive beamformer comprising a delay element including analog random-access memory, wherein the delay element comprises:

an input line configured to receive an input analog electrical signal generated from an acoustic signal received by an array of transducer elements;

a write shift register configured to operate a plurality of write switches connected to the input line;

a plurality of capacitive elements coupled to the plurality of write switches and configured to store a charge that can be read from a plurality of outputs of each capacitive element at different delay times, wherein each capacitive element of the plurality of capacitive elements includes a capacitor, and wherein the write shift register is configured to operate the plurality of write switches such that a first end of the capacitor is coupled to the input line and a second end of the capacitor is coupled to a DC voltage line during a write operation to charge the capacitor relative to a non-zero DC voltage;

a plurality of read shift registers configured to operate a plurality of read switches connected to the plurality of outputs of each capacitive element such that the charge in each capacitive element is non-destructively read at the different delay times from different outputs of each capacitive element; and a plurality of summing elements, each summing element configured to sum output signals from one of the plurality of outputs of each one of the capacitive elements.

2. The receive beamformer of claim 1, wherein the stored charges can be read from the plurality of outputs of each capacitive element in parallel at different delay times.

3. The receive beamformer of claim 1, wherein each capacitor is coupled to a plurality of amplifiers configured to allow interrogation of a stored charge on the capacitor at different delay times, and wherein the capacitor is coupled to an input of a first amplifier of the plurality of amplifiers and an output of the first amplifier during a read operation when the charge is read from the capacitor.

4. The receive beamformer of claim 1, wherein at least a first capacitive element of the capacitive elements includes a plurality of capacitors, and wherein each capacitor in the plurality of capacitors is coupled to a separate write switch such that charge can be written on to each respective capacitor.

5. The receive beamformer of claim 4, wherein the plurality of capacitors of the first capacitive element are coupled to a plurality of amplifiers configured to allow interrogation of stored charges on the capacitors.

6. The receive beamformer of claim 4, wherein the stored charges on the plurality of capacitors of the first capacitive element are configured to be read at same or different times.

7. The receive beamformer of claim 1, wherein a number of summing elements in the beamformer corresponds to a number of lines beamformed during a multiline receive beamforming.

8. The receive beamformer of claim 7, wherein the multiline receive beamforming comprises 2×, or greater multiline receive beamforming.

9. The receive beamformer of claim 1, wherein the array of transducer elements comprises a one-dimensional array or a two-dimensional array of transducer elements, wherein the received acoustic signal is generated from a patch of transducer elements in the array, and wherein each summing element is configured to sum the output signals associated with the patch of transducer elements.

10. The receive beamformer of claim 1, wherein the summing elements comprise summing nodes, common buses, and/or summing circuits, and wherein the write and read shift registers comprise decoders and input and output counters, respectively, for programmable delay times.

11. The receive beamformer of claim 1, wherein the second end of each capacitor is coupled to the DC voltage line during the write operation to charge the capacitor relative to a constant, positive DC voltage.

12. The receive beamformer of claim 11, wherein each output switch of the plurality of output switches comprises a first inverted amplifier and a second inverted amplifier coupled to the second end of each capacitor.

13. An ultrasound probe comprising the receive beamformer of claim 1.

14. The ultrasound probe of claim 13, wherein the receive beamformer is coupled to a system beamformer in an ultrasound system.

15. A method of multiline receive beamforming, the method comprising:

receiving, on an input line, an input analog electrical signal generated from an acoustic signal received by an array of transducer elements;

operating by a write shift register a plurality of write switches connected to the input line;

storing a charge on a plurality of capacitive elements coupled to the plurality of write switches, wherein each capacitive element of the plurality of capacitive elements includes a capacitor, and wherein the operating includes operating the plurality of write switches to couple a first end of the capacitor to the input line and a second end of the capacitor to a DC voltage line during a write operation to charge the capacitor relative to a non-zero DC voltage;

operating by a plurality of read shift registers a plurality of read switches connected to the plurality of outputs of each capacitive element such that the charge in each capacitive element is non-destructively read at different delay times from different outputs of each capacitive element; and summing output signals from each of the outputs of the capacitive elements on a plurality of summing elements, wherein each summing element summing output signals from one of the plurality of outputs of each capacitive element.

16. The method of claim 15, wherein each capacitor is coupled to a plurality of amplifiers configured to allow interrogation of a stored charge on the capacitor at different delay times, and wherein the capacitor is coupled to an input of a first amplifier of the plurality of amplifiers and an output of the first amplifier during a read operation when the charge is read from the capacitor.

17. The method of claim 15, wherein at least a first capacitive element of the capacitive elements includes a plurality of capacitors, and wherein each capacitor in the plurality of capacitors is coupled to a separate write switch such that charge can be written on to each respective capacitor.

* * * * *